(12) United States Patent
Fujita (10) Patent No.: US 9,086,910 B2
(45) Date of Patent: Jul. 21, 2015

(54) LOAD CONTROL DEVICE

(75) Inventor: Naotake Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 294 days.

(21) Appl. No.: 13/576,469

(22) PCT Filed: Jan. 11, 2011

(86) PCT No.: PCT/JP2011/050261
§ 371 (c)(1),
(2), (4) Date: Aug. 1, 2012

(87) PCT Pub. No.: WO2011/096249
PCT Pub. Date: Aug. 11, 2011

(65) Prior Publication Data
US 2013/0104131 A1     Apr. 25, 2013

(30) Foreign Application Priority Data
Feb. 5, 2010   (JP) .................................. 2010-023943

(51) Int. Cl.
*G06F 9/48* (2006.01)
*G06F 9/46* (2006.01)
*G06F 9/50* (2006.01)

(52) U.S. Cl.
CPC ............... *G06F 9/466* (2013.01); *G06F 9/505* (2013.01); *G06F 9/5088* (2013.01); *Y02B 60/142* (2013.01); *Y02B 60/162* (2013.01)

(58) Field of Classification Search
CPC ..... G06F 9/466; G06F 9/4843; G06F 9/5038; G06F 9/52; G06F 9/5016; G06F 9/5027; G06F 9/505; G06F 9/5088; Y02B 60/162; Y02B 60/142
See application file for complete search history.

(56) References Cited

U.S. PATENT DOCUMENTS 5,095,421 A * 3/1992 Freund .......................... 718/101
6,226,377 B1 * 5/2001 Donaghue, Jr. .......... 379/265.13
(Continued)

FOREIGN PATENT DOCUMENTS

| JP | 62-198949 A | 9/1987 |
|----|-------------|--------|
| JP | 08087473 A  | 4/1996 |

(Continued)

OTHER PUBLICATIONS

Office Action issued Jul. 9, 2013, by the Japanese Patent Office, in corresponding Application No. 2010-023943.

*Primary Examiner* — Van Nguyen
(74) *Attorney, Agent, or Firm* — Sughrue Mion, PLLC (57) ABSTRACT

A load control device 10 for assigning transaction processes to a plurality of computation resources has: a receiver 101 that receives a transaction process request; an assignment controller 102 that selects appropriate assignment destinations to which received transactions are assigned, and then stores the transactions in transmission queues 103 provided for the assignment destinations respectively; a transmitter 104 that transmits transaction data stored in the transmission queues 103 to the assignment destinations; an overflow detector 105 that monitors whether or not the number of transactions accumulated in each of the transmission queues 103 corresponding to the respective assignment destinations exceeds an upper limit; and a reassigning part 106 that, when the number of transactions exceeds the upper limit as a result of the monitoring by the overflow detector 105, reselects assignment destinations to which the transactions stored at the number of transactions exceeding the upper limit are assigned.

7 Claims, 12 Drawing Sheets

(56) References Cited

U.S. PATENT DOCUMENTS

| | | |
|---|---|---|
| 6,578,068 B1 * | 6/2003 | Bowman-Amuah .......... 709/203 |
| 7,096,335 B2 * | 8/2006 | Chen et al. ................... 711/165 |
| 7,430,290 B2 * | 9/2008 | Zhu .......................... 379/265.01 |
| 7,490,179 B2 * | 2/2009 | Neyama et al. ................. 710/52 |
| 7,590,983 B2 * | 9/2009 | Neiman et al. ............... 718/100 |
| 7,606,154 B1 * | 10/2009 | Lee ............................... 370/232 |
| 7,712,102 B2 * | 5/2010 | Herington et al. ............ 718/105 |
| 7,881,961 B2 * | 2/2011 | Ricketts ........................ 705/7.12 |
| 7,992,151 B2 * | 8/2011 | Warrier et al. ................ 718/104 |
| 8,036,372 B2 * | 10/2011 | Patakula et al. .......... 379/266.01 |
| 8,037,329 B2 * | 10/2011 | Leech et al. .................. 713/320 |
| 8,201,219 B2 * | 6/2012 | Jones ................................. 726/3 |
| 2004/0111596 A1 | 6/2004 | Rawson, III |
| 2005/0076043 A1 * | 4/2005 | Benedetti et al. ............. 707/100 |
| 2008/0007765 A1 | 1/2008 | Ogata et al. |
| 2010/0262971 A1 | 10/2010 | Yamada |

FOREIGN PATENT DOCUMENTS

| | | |
|---|---|---|
| JP | 9-81399 A | 3/1997 |
| JP | 9-212467 A | 8/1997 |
| JP | 2004-192612 A | 7/2004 |
| JP | 2005-196262 A | 7/2005 |
| JP | 2007200128 A | 8/2007 |
| JP | 2008-015888 A | 1/2008 |
| JP | 4265377 B2 | 5/2009 |
| WO | 2005083574 A1 | 9/2005 |
| WO | 2010010723 A1 | 1/2010 |

* cited by examiner

ASSIGNMENT TABLE

|  | ASSIGNMENT DESTINATION 1 | ASSIGNMENT DESTINATION 2 | ASSIGNMENT DESTINATION 3 | ASSIGNMENT DESTINATION 4 | ASSIGNMENT DESTINATION 5 | ASSIGNMENT DESTINATION 6 | ASSIGNMENT DESTINATION 7 |
|---|---|---|---|---|---|---|---|
| DATA REGION A | O | | | | | | |
| DATA REGION B | | O | | | | | |
| DATA REGION C | | | O | | | | |
| DATA REGION D | | | | O | | | |
| DATA REGION E | | | | | O | | |
| DATA REGION F | | | | | | O | |
| DATA REGION G | | | | | | | O |

Fig. 4

USABLE TABLE

| | ASSIGNMENT DESTINATION 1 | ASSIGNMENT DESTINATION 2 | ASSIGNMENT DESTINATION 3 | ASSIGNMENT DESTINATION 4 | ASSIGNMENT DESTINATION 5 | ASSIGNMENT DESTINATION 6 | ASSIGNMENT DESTINATION 7 |
|---|---|---|---|---|---|---|---|
| CRITICAL STATE | 50 | 100 | 100 | 0 | 100 | 100 | 100 |

FIGURES IN THE TABLE INDICATED BY PERCENTAGE

ELEMENT-ASSIGNMENT DESTINATION CORRESPONDENCE TABLE

| | ELEMENT 1 | ELEMENT 2 | ELEMENT 3 | ELEMENT 4 | ELEMENT 5 | ELEMENT 6 | ELEMENT 7 | ELEMENT 8 | ELEMENT 9 |
|---|---|---|---|---|---|---|---|---|---|
| ASSIGNMENT DESTINATION 1 | ○ | × | | | | | | | |
| ASSIGNMENT DESTINATION 2 | | | ○ | ○ | | | | | |
| ASSIGNMENT DESTINATION 3 | | | | | ○ | | | | |
| ASSIGNMENT DESTINATION 4 | | | | | | × | | | |
| ASSIGNMENT DESTINATION 5 | | | | | | | ○ | | |
| ASSIGNMENT DESTINATION 6 | | | | | | | | ○ | |
| ASSIGNMENT DESTINATION 7 | | | | | | | | | ○ |

Fig. 5

UPPER LIMIT TABLE

|  | ASSIGNMENT DESTINATION 1 | ASSIGNMENT DESTINATION 2 | ASSIGNMENT DESTINATION 3 | ASSIGNMENT DESTINATION 4 | ASSIGNMENT DESTINATION 5 | ASSIGNMENT DESTINATION 6 | ASSIGNMENT DESTINATION 7 |
|---|---|---|---|---|---|---|---|
| UPPER LIMIT | 1600 | 1600 | 1600 | 1600 | 800 | 800 | 600 |

Fig. 6

AFFINITY TABLE

|  | ASSIGNMENT DESTINATION 1 | ASSIGNMENT DESTINATION 2 | ASSIGNMENT DESTINATION 3 | ASSIGNMENT DESTINATION 4 | ASSIGNMENT DESTINATION 5 | ASSIGNMENT DESTINATION 6 | ASSIGNMENT DESTINATION 7 |
|---|---|---|---|---|---|---|---|
| DATA REGION A | 16 | 12 | 12 | 12 | 4 | 4 | 2 |
| DATA REGION B | 12 | 16 | 12 | 12 | 4 | 4 | 2 |
| DATA REGION C | 12 | 12 | 16 | 12 | 4 | 4 | 2 |
| DATA REGION D | 12 | 12 | 12 | 16 | 4 | 4 | 2 |
| DATA REGION E | 4 | 4 | 4 | 4 | 8 | 6 | 4 |
| DATA REGION F | 4 | 4 | 4 | 4 | 6 | 8 | 4 |
| DATA REGION G | 4 | 4 | 4 | 4 | 2 | 2 | 6 |

POWER CONSUMPTION MODEL

|  | CORE 1 | CORE 2 | CORE 3 | CORE 4 | CORE 5 | CORE 6 | CORE 7 | CORE 8 | CORE 9 |
|---|---|---|---|---|---|---|---|---|---|
| CORE 1 | 15 | 17 | 30 | 30 | 35 | 35 | 35 | 35 | 35 |
| CORE 2 | 17 | 15 | 30 | 30 | 35 | 35 | 35 | 35 | 35 |
| CORE 3 | 30 | 30 | 15 | 17 | 35 | 35 | 35 | 35 | 35 |
| CORE 4 | 30 | 30 | 17 | 15 | 35 | 35 | 35 | 35 | 35 |
| CORE 5 | 35 | 35 | 35 | 35 | 20 | 40 | 40 | 40 | 40 |
| CORE 6 | 35 | 35 | 35 | 35 | 40 | 20 | 40 | 40 | 40 |
| CORE 7 | 35 | 35 | 35 | 35 | 40 | 40 | 20 | 40 | 40 |
| CORE 8 | 35 | 35 | 35 | 35 | 40 | 40 | 40 | 20 | 40 |
| CORE 9 | 35 | 35 | 35 | 35 | 40 | 40 | 40 | 40 | 20 |

CORE-ASSIGNMENT DESTINATION CORRESPONDENCE TABLE

|  | CORE 1 | CORE 2 | CORE 3 | CORE 4 | CORE 5 | CORE 6 | CORE 7 | CORE 8 | CORE 9 |
|---|---|---|---|---|---|---|---|---|---|
| ASSIGNMENT DESTINATION 1 | O | O |  |  |  |  |  |  |  |
| ASSIGNMENT DESTINATION 2 |  |  | O | O |  |  |  |  |  |
| ASSIGNMENT DESTINATION 3 |  |  |  |  | O |  |  |  |  |
| ASSIGNMENT DESTINATION 4 |  |  |  |  |  | O |  |  |  |
| ASSIGNMENT DESTINATION 5 |  |  |  |  |  |  | O |  |  |
| ASSIGNMENT DESTINATION 6 |  |  |  |  |  |  |  | O |  |
| ASSIGNMENT DESTINATION 7 |  |  |  |  |  |  |  |  | O |

Fig. 11

INSTANT EXPANSION MODEL

|  | ELEMENT 1 | ELEMENT 2 | ELEMENT 3 | ELEMENT 4 | ELEMENT 5 | ELEMENT 6 | ELEMENT 7 | ELEMENT 8 | ELEMENT 9 |
|---|---|---|---|---|---|---|---|---|---|
| RECOVERY TIME PERIOD | 0.1 | 0.1 | 0.1 | 0.1 | 0.2 | 0.2 | 0.2 | 0.2 | 0.2 |
| REDUCED POWER | 3 | 3 | 3 | 3 | 4 | 4 | 4 | 4 | 4 |

Fig. 12

LOAD CONTROL DEVICE

CROSS REFERENCE TO RELATED APPLICATIONS

This application is a National Stage of International Application No. PCT/JP2011/050261 filed on Jan. 11, 2011, which claims priority from Japanese Patent Application No. 2010-023943, filed on Feb. 5, 2010, the contents of all of which are incorporated herein by reference in their entirety.

BACKGROUND

The present invention relates to a load control device.

A load distribution process needs to be executed among a plurality of computation resources in order to perform transaction processes using a system configured by the plurality of computation resources.

Patent Literature 1, for example, discloses a load distribution device that has, in a node group configuring a computer system, task transmission/reception means for transmitting/receiving a task or a result of executing the task, queuing means for queuing the task received by the task transmission/reception means (referred to as "local queuing means"), load information sharing means for sharing load information, load distribution means for determining which task to transfer to a node based on the load information of another node that is provided by the load information sharing means, and then requesting the task transmission/reception means to transfer the task, and task execution means for processing the task that is requested to be executed, and then returning a result of the execution of the task to the local queuing means, wherein the load distribution means includes balance level computing means for dynamically computing the amount of tasks to be executed by at least its own node, and node priority assignment means for assigning a priority order to the nodes.

Japanese Patent Publication No. 4265377

There are various granularities in tasks used in a business system. In online transaction processes, relatively granular tasks are used in each process, and each process can be managed based on a service level index such as a turnaround time. From the perspective of reducing costs and power consumption, it is desirable to maintain the service level index such as a turnaround time, while efficiently taking advantage of available computation resources and available power that keep changing every minute. In order to do so, it is necessary to dynamically assign tasks to appropriate computation resources so that processes do not concentrate on a specific computation resource to generate overflowing processes. In order to prevent the generation of overflowing processes, it is desired to adjust the number of tasks to provide an appropriate number of tasks prior to transmitting the tasks to the computation resources. However, such adjustment is not performed prior to transmitting the tasks to the computation resources, in the method described in Patent Literature 1. Moreover, in the existing load balancing methods, because the rules for assigning tasks are fixed rules, the tasks cannot be assigned dynamically. Furthermore, with the uniform computation resources being preconditioned, even in an environment where computation resources are not uniform, the tasks are assigned mechanically without taking the most appropriate computation resources into consideration. In addition, because the mechanism for maintaining the service level indices such as turnaround times is not adopted by the existing load balancing methods, the methods cannot be conformed to the ever-changing computation resources. This makes it impossible to take detailed steps.

SUMMARY

An exemplary object of the present invention, therefore, is to maintain a service level index such as a turnaround time required in a parallel online transaction process, with as little computation resources and power consumption possible.

A load control device according to an exemplary aspect of the present invention is a load control device for assigning transaction processes to a plurality of computation resources, the load control device having: a receiver that receives a transaction process request; an assignment controller that selects assignment destinations to which received transactions are assigned, and then stores the transactions in transmission queues provided for the assignment destinations respectively; a transmitter that transmits transaction data stored in the transmission queues to the assignment destinations; an overflow detector that monitors whether or not the number of transactions accumulated in each of the transmission queues corresponding to the respective assignment destinations exceeds an upper limit; and a reassigning part that, when the number of transactions exceeds the upper limit as a result of the monitoring by the overflow detector, reselects assignment destinations to which the transactions stored at the number of transactions exceeding the upper limit are assigned.

The present invention can maintain a service level index such as a turnaround time required in a parallel online transaction process, with as little computation resources and power consumption possible.

EXEMPLARY EMBODIMENT

The best mode for carrying out the present invention is described hereinafter in detail with reference to the drawings.

Figure 1:
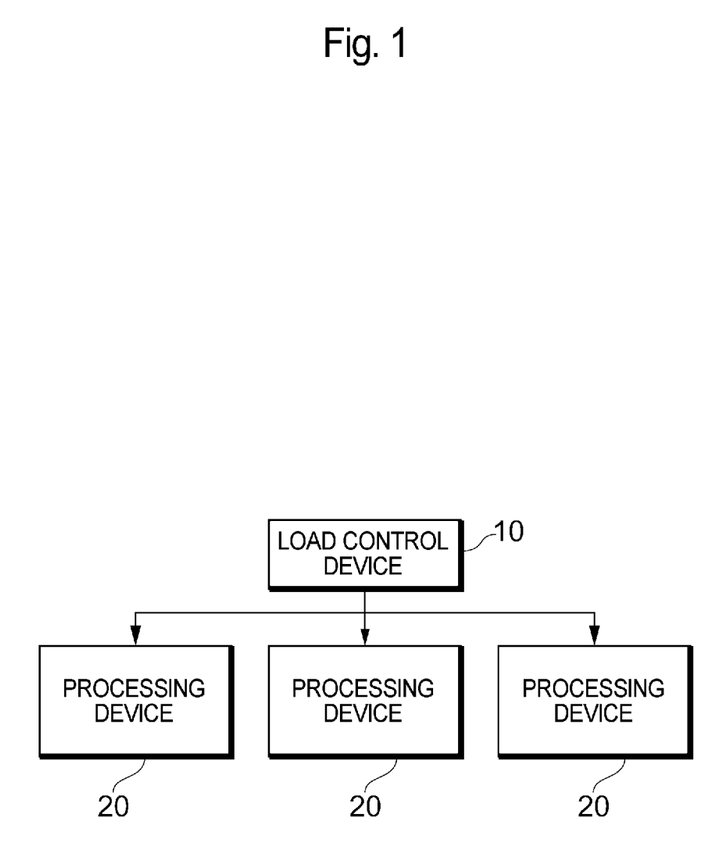
FIG. 1 is a diagram showing a configuration of a load control system that uses a load control device according to an embodiment of the present invention.

FIG. 1 is a diagram showing a configuration of a load control system that uses a load control device 10 according to the present embodiment. As shown in the diagram, the load control device 10 is connected to a plurality of processing devices (computation resources) 20 by a communication line.

The load control system according to the present embodiment processes individual online transactions in parallel by using the plurality of processing devices 20.

Figure 2:
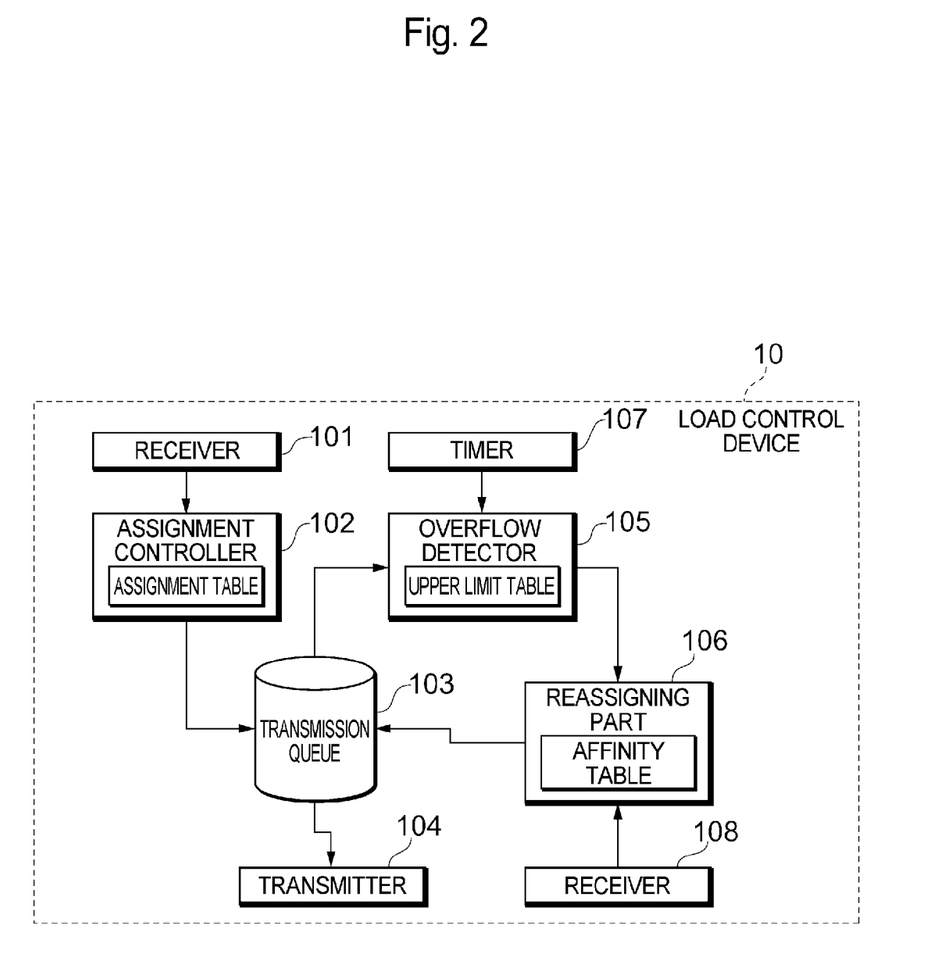
FIG. 2 is a diagram showing a configuration of the load control device according to the embodiment of the present invention.

FIG. 2 is a diagram showing a configuration of the load control device 10 according to the present embodiment. As shown in the diagram, the load control device 10 has a receiver 101, assignment controller 102, transmission queue 103, transmitter 104, overflow detector 105, reassigning part 106, timer 107, and a receiver 108. The receiver 101, assignment controller 102, transmitter 104, overflow detector 105, reassigning part 106, timer 107, and receiver 108 correspond to functions that are executed by a processor of a computer in accordance with a program. The transmission queue 103 includes storage devices such as a memory and hard disk.

The receiver 101 receives transaction process requests from, for example, terminals connected by the communication line.

The assignment controller 102 refers to an assignment table to select an appropriate assignment destination to which a received transaction is assigned, and stores the transaction in the transmission queue 103 provided for each assignment destination. Each assignment destination includes one or more processor cores (computation resources). When a plurality of cores are included in each assignment destination, each of the cores may be mounted in one processing device 20 or distributed to a plurality of the processing devices 20.

Figure 3:
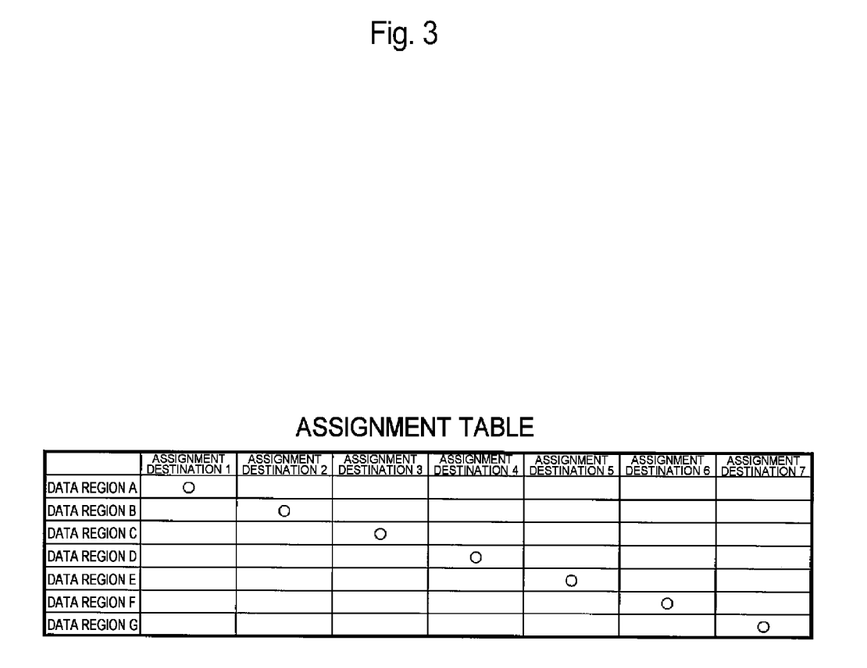
FIG. 3 is a diagram showing contents of an assignment table.

FIG. 3 is a diagram showing contents of the assignment table. As shown in the diagram, appropriate assignment destinations for respective data regions are stored in the assignment table in advance. Each data region corresponds to a group of data to be processed in a certain transaction, the data being stored in a database 207. The assignment controller 102 selects an appropriate assignment destination from the assignment table, based on which data region is the subject of processing by the received transaction. As described above, each assignment destination may correspond to one processing device 20 or a plurality of the processing devices 20. The assignment table includes a usable table that shows an ON/OFF state of the power source of an assignment destination processing device 20 and the degree of performance degradation caused as a result of turning off the power source of a component or the degree of performance degradation caused by a failure occurring in the load control system or caused as a result of suspending a regular planned maintenance of the load control system.

Figure 4:
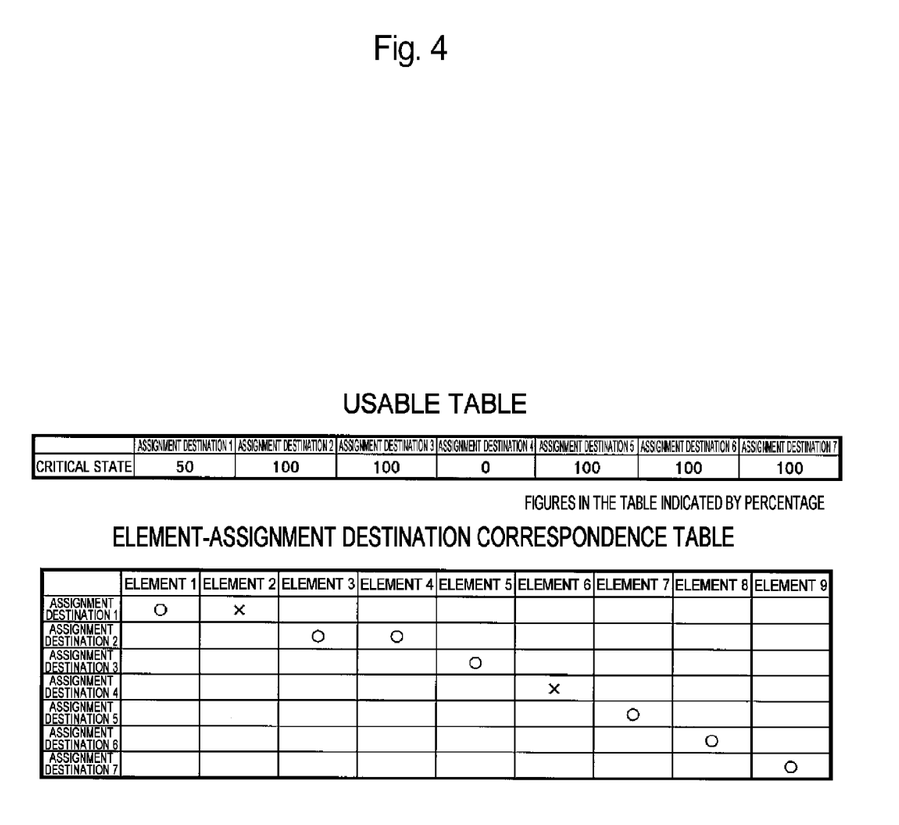
FIG. 4 is a diagram showing contents of a usable table.

FIG. 4 shows an example of the usable table. The usable table is created based on "element-assignment destination correspondence table." As shown in FIG. 4, critical states of the assignment destinations are stored in the usable table. Each critical state is determined based on the OFF state of the power source of an element included in each assignment destination or the degree of performance degradation caused due to a system failure. For example, when available states of the elements included in the assignment destinations are as shown in the "element-assignment destination correspondence table," an element 1 of an assignment destination 1 is available (O) but an element 2 is unavailable (x). Therefore, the critical state of the assignment destination 1 is 50%. The usable table reflects the latest state of each processing device and therefore needs to be reevaluated on a regular basis.

The transmission queue 103 is provided for each assignment destination. Data of transactions assigned to the assignment destinations are stored sequentially in the transaction queues 103.

The transmitter 104 transmits the transaction data stored in the transmission queues 103 to the corresponding assignment destination processing devices 20. When a single assignment destination includes a plurality of processor cores, the transmitter 104 transmits the transaction data evenly to each of the processor cores by using, for example, a round-robin method.

The overflow detector 105 refers to the upper limit table and regularly monitors whether or not the number of transactions accumulated in the transmission queue 103 corresponding to each assignment destination exceeds an upper limit.

Figure 5:
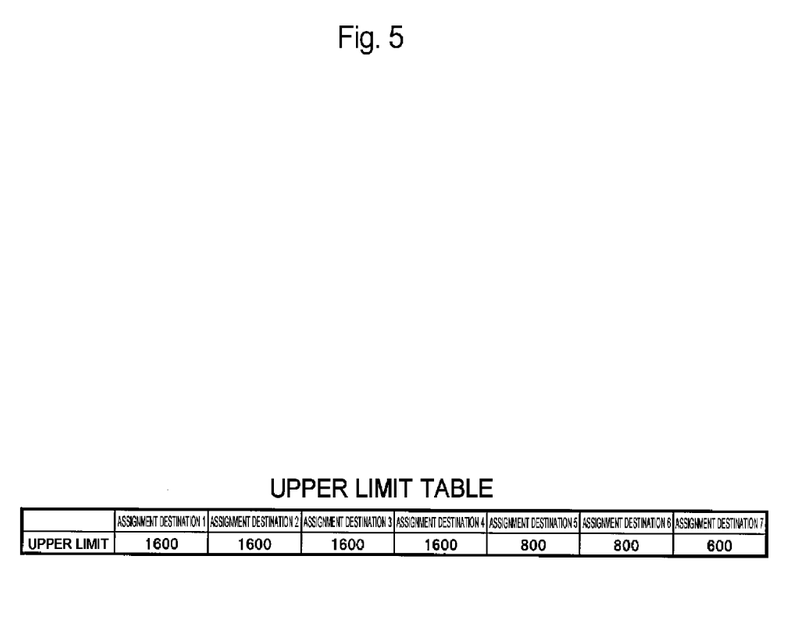
FIG. 5 is a diagram showing contents of an upper limit table.

FIG. 5 is a diagram showing contents of the upper limit table. As shown in the diagram, upper limit values of the transactions that can be accumulated in the transmission queues 103 corresponding to the respective assignment destinations are stored in the upper limit table in advance. Each of the upper limit values can be, for example, the number of transactions that can be processed every certain amount of time.

The reassigning part 106 refers to an affinity table to select a reassignment destination, when the number of transactions accumulated in each transmission queue 103 exceeds the upper limit value as a result of the monitoring by the overflow detector 105. When the reassignment destination has overflowing transactions, the transactions are assigned sequentially to candidates of the next highest priority. When there are no more assignment destination candidates, an error process is executed.

Figure 6:
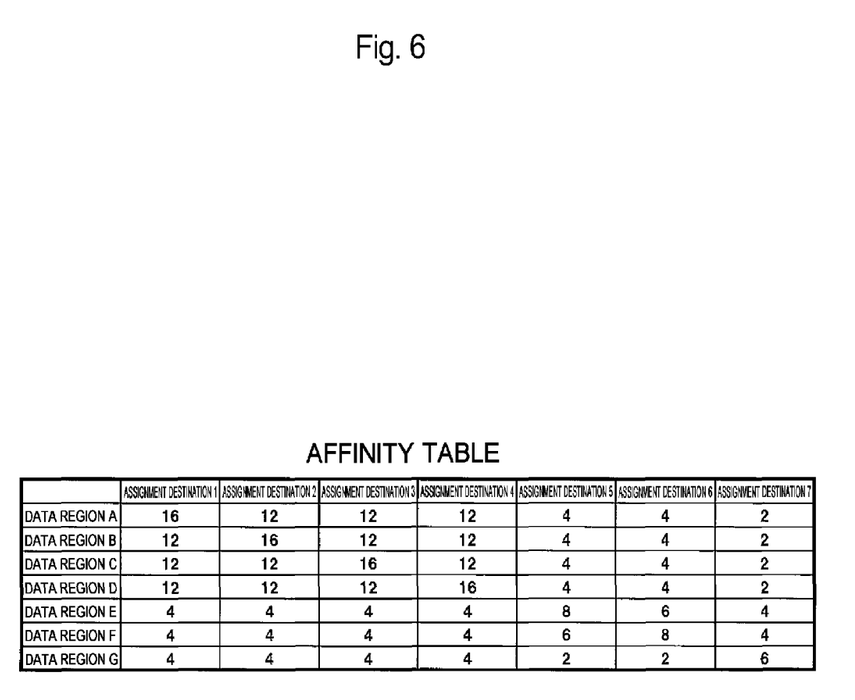
FIG. 6 is a diagram showing contents retained by an affinity table.

FIG. 6 is a diagram showing contents retained in the affinity table. As shown in the diagram, the affinity table stores performance values of the processes for the data of the data regions are stored with respect to the assignment destinations. Each of the performance values can be, for example, the number of transaction processes performed per unit time or an average turnaround time required in one transaction process.

A process performance in a specific data region is determined based on the easiness of access to the database 207 having the data of the data regions. Generally, the highest process performance is obtained when a cache controller 206 for caching the data of the database 207 including the data to be processed and a processing part 205 for executing the transaction processes are mounted in the same processing device 20. The more other controllers and the like are present in the access path between the cache controller 206 and the processor 205, the lower the process performance becomes. In the affinity table, the assignment destinations of the highest process performance for the data regions correspond to the assignment destinations shown in the assignment table.

The timer 107 determines the timing at which the overflow detector 105 monitors a throughput of each processing device 20. Examples of a method that the overflow detector 105 uses to monitor the throughput include a method of constantly monitoring the throughput and immediately notifying the reassigning part 106 of that the number of transactions in the transmission queue 103 assigned to any of the assignment destinations exceeds the upper limit. However, this method requires the notification every time when there are overflowing transactions, lowering the process performance.

The receiver 108 receives information on the overflowing transaction processes and the like from each of the processing devices 20.

Figure 7:
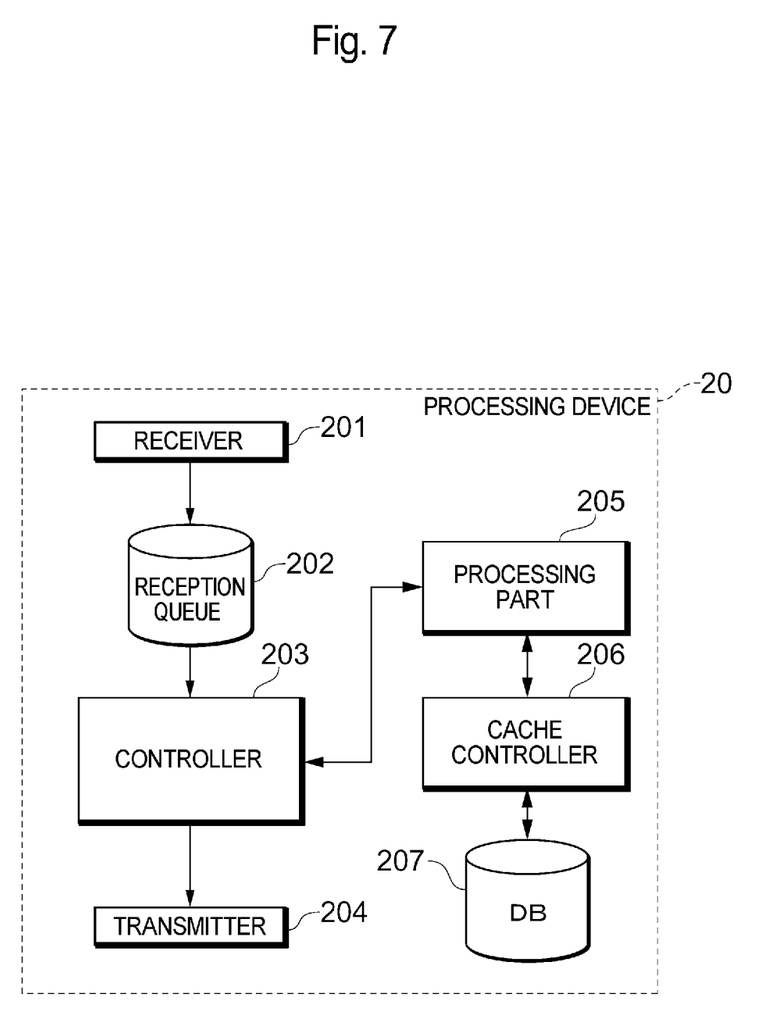
FIG. 7 is a diagram showing a configuration of a processing device.

FIG. 7 is a diagram showing a configuration of one of the processing devices 20. As shown in the diagram, the processing device 20 has a receiver 201, a reception queue 202, a controller 203, a transmitter 204, the processing part (computation resource, processor core) 205, the cache controller 206, and the database 207.

The receiver 201 receives transaction requests from the load control device 10.

The reception queue 202 is a storage unit in which the transaction requests received by the receiver 201 are accumulated sequentially.

The controller 203 supplies the transaction request accumulated in the reception queue 202 to the processing part 205. When overflowing transaction processes are detected, the controller 203 notifies the load control device 10, via the transmitter 204, of the detection result.

The transmitter 204 transmits to the load control device 10 information on the overflowing transaction processes and the like.

The processing part 205 executes the transactions and updates the database 207. The processing device 20 may have a single core configuration with one processing part 205 or may have a multi-core configuration with a plurality of the processing parts 205.

The cache controller 206 temporarily stores the contents of the database 207. In the present embodiment, the cache controller 206 of at least one of the other processing devices 20 can be accessed.

The database 207 retains the data that are subjected to a transaction process.

Operations of the load control system having the load control device 10 are described next.

Figure 8:
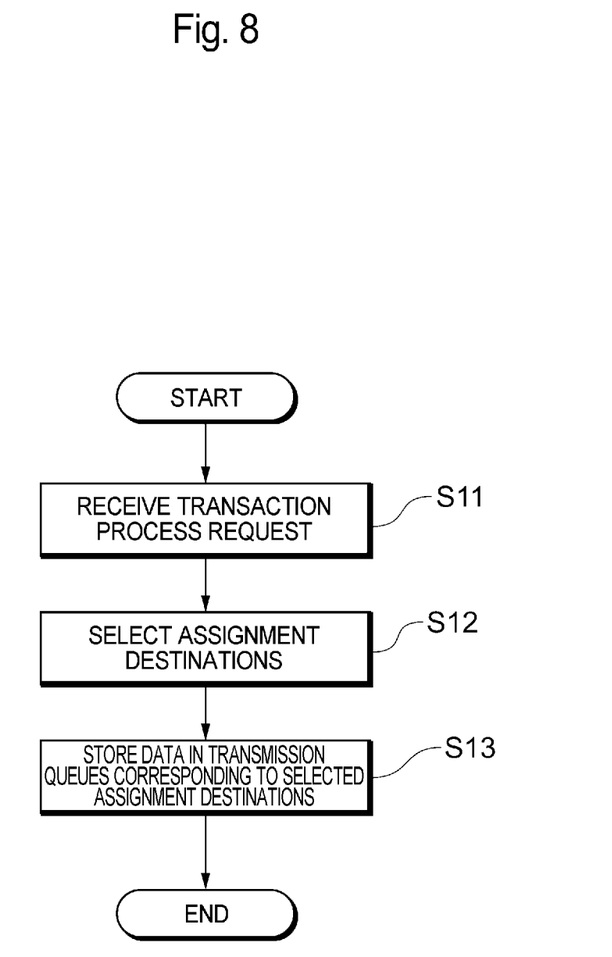
FIG. 8 is a flowchart of a transaction assignment process performed by the load control device according to the embodiment of the present invention.

FIG. 8 is a flowchart of a transaction assignment process performed by the load control device 10. First, the receiver 101 of the load control device 10 receives a transaction process request (step S11).

Next, the assignment controller 102 refers to the assignment table to select an appropriate assignment destination to which the received transaction is assigned (step S12).

The assignment controller 102 then stores the data of the transaction process in the transmission queue 103 corresponding to the assignment destination selected in step S2 (step S13).

The transmitter 104 sequentially transmits the transaction data stored in the transmission queue 103 to the processing device 20 of the corresponding assignment destination.

Figure 9:
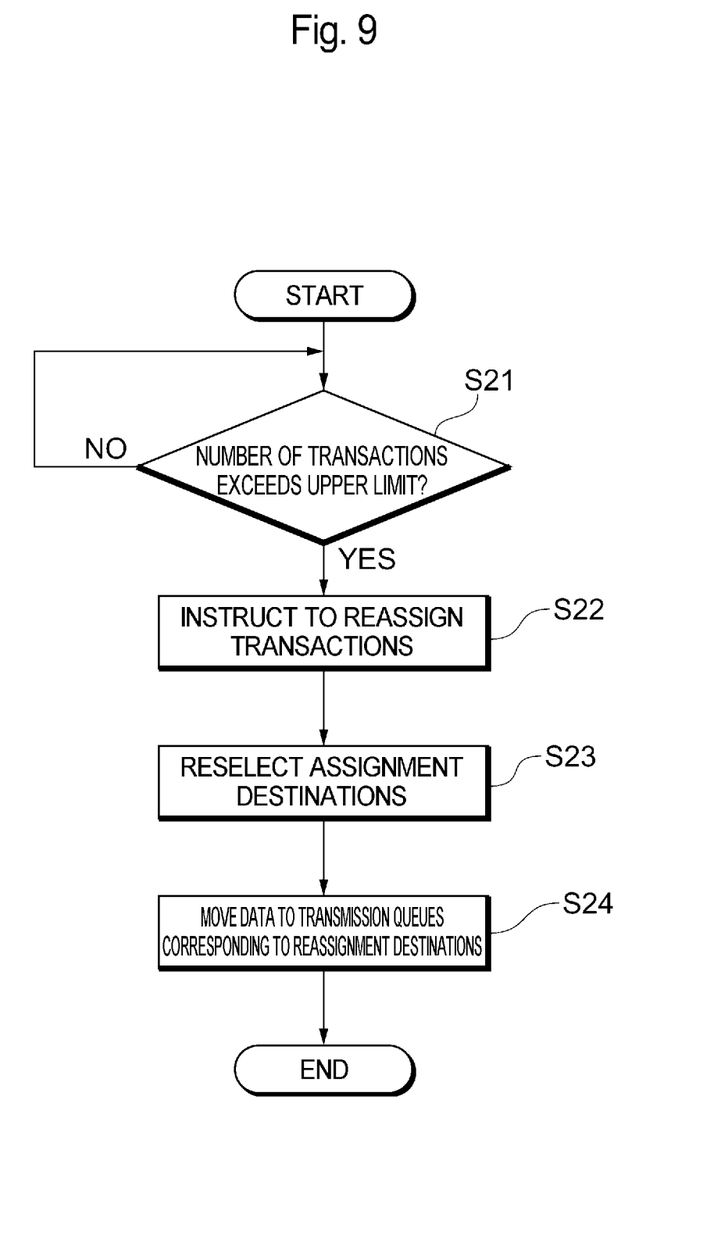
FIG. 9 is a flowchart of a process performed when overflowing transaction processes are generated.

FIG. 9 is a flowchart of a process performed when overflowing transaction processes are generated.

First, when the overflow detector 105 detects that the number of transactions accumulated in the transmission queue 103 corresponding to each assignment destination exceeds the upper limit (step S21: YES), the overflow detector 105 instructs the reassigning part 106 to reassign the transactions (step S22).

The reassigning part 106 refers to the affinity table to reselect assignment destinations to which the overflowing transactions are assigned (step S23).

A method of reassigning the transactions is described specifically using FIGS. 3, 5, and 6. For example, as shown in the assignment table of FIG. 3, a transaction for processing the data of a data region A is first assigned to the assignment destination 1 by the assignment controller 102. However, when 1600 or more transactions are accumulated in the transmission queue 103 of the assignment destination 1 as shown in the upper limit table of FIG. 5, the overflow detector 105 instructs the reassigning part 106 to reassign the transactions. The reassigning part 106 refers to the affinity table shown in FIG. 6 to select an assignment destination, the transaction process performance (the number of processes per unit time) of which to process the data of the data region A is the highest next to that of the assignment destination 1. In the example shown in FIG. 6, the assignment destinations having the second highest transaction process performance correspond to assignment destinations 2, 3, and 4. Therefore, the reassigning part 106 selects the reassignment destination from among these assignment destinations.

Once the reassignment destination is determined, the reassigning part 106 moves the stored transaction data to the transmission queue 103 corresponding to the reassignment destination, the stored transactions data corresponding to the transactions, the number of which exceeds the upper limit (step S24).

The transmitter 104 sequentially transmits the transaction data stored in the transmission queues 103 to the processing devices 20 of the corresponding assignment destinations. As described above, in the present embodiment, the cache controllers 206 of the other processing devices 20 can be accessible among the processing devices 20, even when the data to be processed in the transactions are not cached in the cache controllers 206 of the assignment destination processing devices 20, the cache controllers 206 of the other processing devices 20 in which the data are cached can be accessed, in order to execute the processes.

Although it does not happen during a normal operation, even when the receiver 108 receives the information on the overflowing transaction processes from each processing device 20 other than when the reassigning part 106 receives an instruction from the overflow detector 105, the reassigning part 106 reassigns the transactions.

According to the embodiment described above, the assignment controller 102 determines the appropriate transaction assignment destinations and accumulate the transactions in the transmission queue 103 provided for each of the assignment destinations. Therefore, a service level index such as a turnaround time required in a parallel online transaction process can be maintained with as little computation resources as possible. In addition, the overflow detector 105 regularly monitors whether the number of transactions accumulated in the transmission queues 103 corresponding to the assignment destinations exceeds the upper limit. When the number of transactions exceeds the upper limit, the reassigning part 106 re-determines the assignment destinations. In this manner, degradation of the service level indices, such as lengthening of the turnaround times due to the overflowing processes in a specific processing device 20, can be prevented.

In the load control device 10, the transaction assignment destinations are determined, and then the transaction data are transmitted to each processing device 20 after an adjustment for preventing the generation of overflowing processes is performed. Therefore, the computation resources can be utilized effectively in the transaction processes, without providing each processing device 20 with a function for performing the abovementioned adjustment.

The load control device 10 according to the present embodiment is especially suitable for performing load control in an online transaction system that uses a database for retaining a large volume of data. Particularly, in a case of a transaction process in which the data in the database is partitioned in order to prevent data conflict, it is affinity to the data of each computation resource that exerts the most influence on the process performance.

Because such transactions where data conflict rarely occurs have relatively balanced loads, the total amount of loads can be more easily estimated from the number of transactions. For this reason, s suitable determination can be made as to the overflowing transactions by using the upper limit table, as described in the present embodiment.

The load control system according to the present invention has the plurality of processing devices 20, wherein the cache controllers 206 can access the cache controller 206 of at least one of the other processing devices 20. Examples of a configuration of such a system include a CC-NUMA (cache-coherent Non-Uniform Memory Access). The CC-NUMA has a multi-processor configuration in which all processors thereof share a common memory address space. Thus, the processor of a certain node can access to the memories of the other nodes. Each of the processors locally has a high-speed memory. The access speed of the other processors to the local memories is slower than the access speed of this high-speed memory. Thus, the CC-NUMA is suitable to the load control system of the present embodiment in which the assignment destinations are determined based on the affinity to the data of the computation resources.

Next is described a method of configuring the assignment destinations, the method being used for reducing the power consumption.

Figure 10:
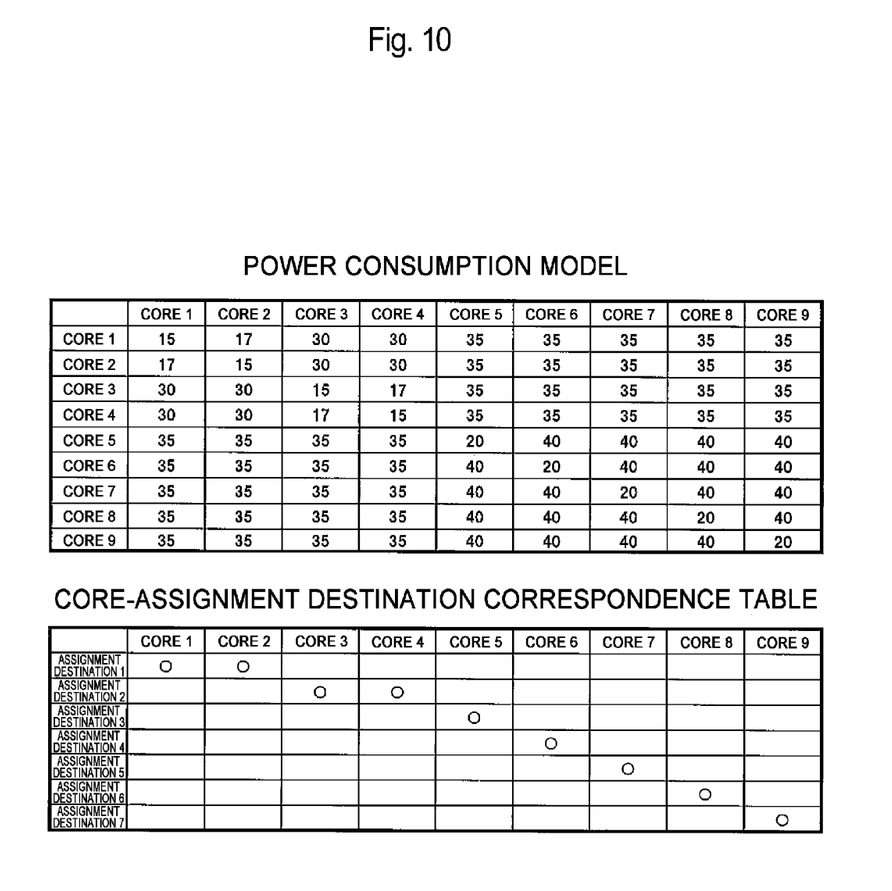
FIG. 10 is a diagram for explaining a method of determining assignment destinations based on power consumption.

FIG. 10 is a diagram for explaining a method of determining the assignment destinations based on power consumption. A power consumption model table shows the power consumption obtained during the operation of each of the cores (the processing parts 205 of the processing devices 20). The value of the intersection between a "core N" row (N=1, ..., 9) and a "core N" column represents the power consumption obtained when the core N is operated alone. The value of the intersection between the "core N" row and a "core M" column (M=1, ..., 9) represents a total power consumption obtained when the core N and the core M are operated simultaneously. For instance, when a core 1 and core 2 are operated independently, the power consumptions there of are "15." When the core 1 and the core 2 are operated simultaneously, the total power consumption is "17." Therefore, the power consumption obtained when operating the core 1 and the core 2 simultaneously is lower than that obtained when operating these cores independently.

When a core 5 is operated independently, the power consumption is "20." However, in the example of the core 5, there are no combinations that generate a lower total power consumption by operating the core 5 along with any of the other cores.

A core-assignment destination correspondence table shows the configurations of the assignment destinations that generate the power consumptions determined based on the power consumption model. As shown by this table, the assignment destinations 1 and 2 are each configured by two cores, and the assignment destinations 3 to 7 are each configured by a single core.

As described above, the power consumption of the system can be reduced by determining the configurations of the assignment destinations based on the power consumption model of the cores configuring the processing devices 20.

Figure 11:
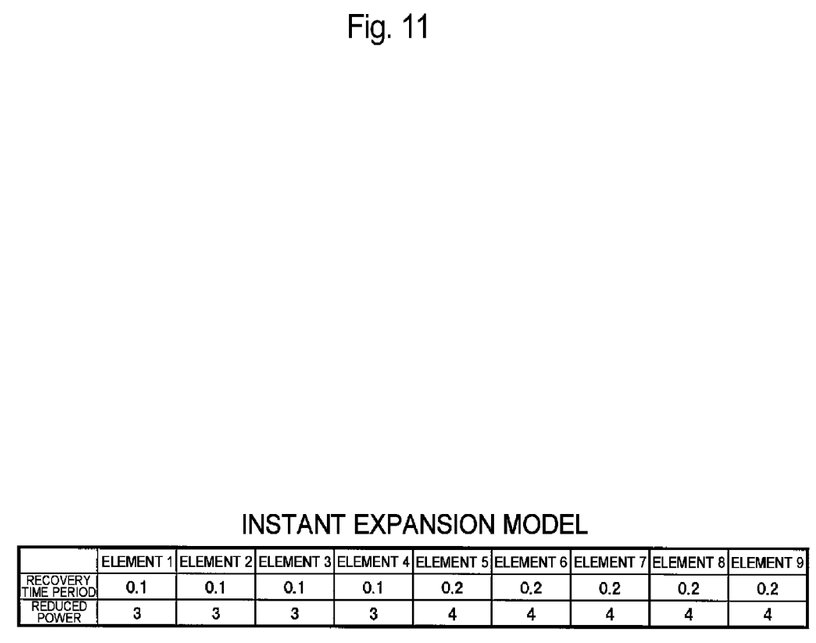
FIG. 11 is a diagram for explaining an instant expansion model.

In addition to the power consumption model, an instant expansion model of FIG. 11 that generates an assignment table may be used. The assignment table is generated based on the information on a power reduction (reduced power) obtained when the power source of each of the computation resources (elements) of the system is turned off and the information on a preparation time period (recovery time period) required to start reusing the computation resources.

Depending on the amount of transaction data, it is not necessary always to turn on all of the power sources of the computation resources of the system. Therefore, normally it is desired to turn off the power sources of some of the computation resources in order to be able to promptly cope with an expected increase in the number of transactions. In other words, when it is expected that the number of transactions be increased by S in N seconds, the computation resources that can be reused within N seconds are secured in order to cope with the S transactions, and the power sources of the other computation resources are turned off.

When using the instant expansion model, it is necessary to increase the number of assignment destination candidates immediately after the turned-off computation resources become available. Thus, means for regularly monitoring an ON/OFF state of the power source of each computation resource is provided. Once the increase in the number of newly available assignment destinations is detected, the usable table is updated.

In a modification of the instant expansion model, some of the computation resources may be separated from the system and returned to a resource pool, instead of turning the power sources of these computation resources off. In this case, the assignment table is generated based on the information on usage fees that are reduced when returning the computation resources to the resource pool and the information on the preparation time period required to start reusing the computation resources.

Figure 12:
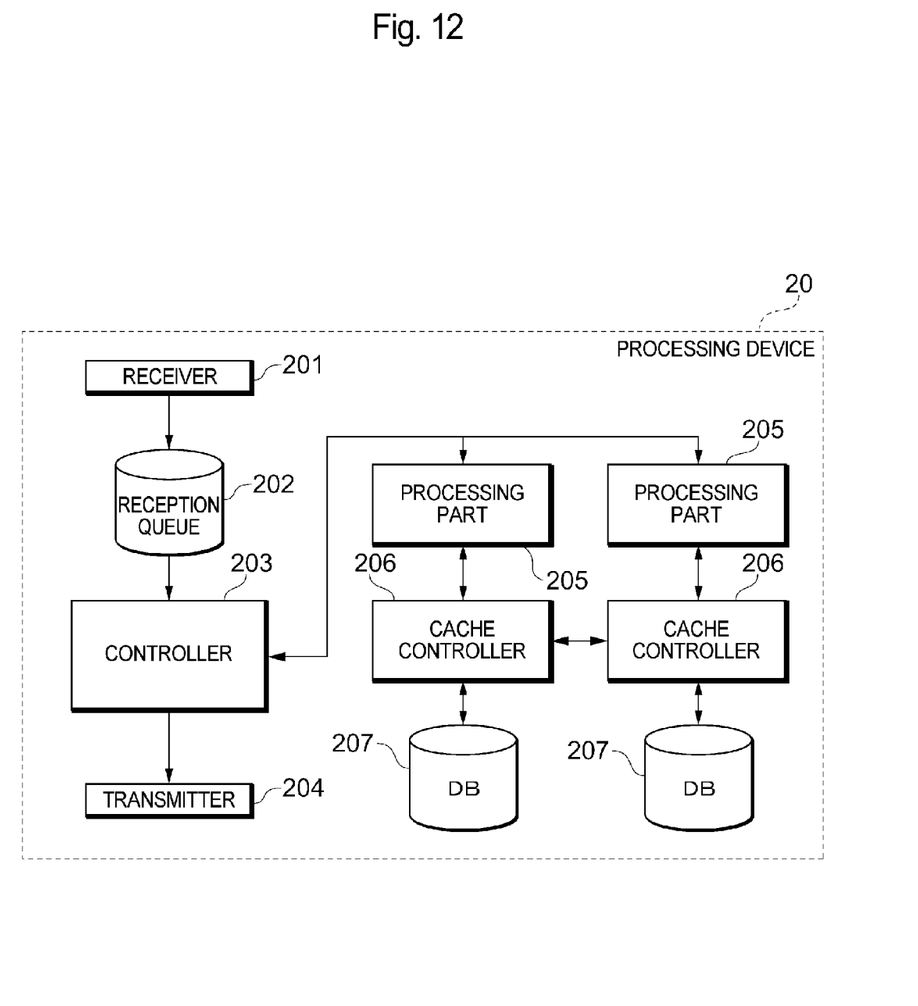
FIG. 12 is a diagram showing another example of a configuration of the processing device.

The configuration of each processing device 20 is not limited to the one shown in FIG. 7; thus, the one shown in FIG. 12, for example, may be used. The example in FIG. 12 shows a multi-core configuration of a processing device 20 that includes two processing parts 205, two cache controllers 206, and two databases 207.

This application claims priority to Japanese Patent Application No. 2010-23943 filed on Feb. 5, 2010, the contents of which are hereby incorporated by reference into the present application.

The above has described the present invention with reference to the embodiment; however, the present invention is not limited to the embodiment. The configurations and details of the present invention can be changed in various ways within the scope of the present invention as would be appreciated by those skilled in the art.

The present invention is suitable for maintaining a service level index such as a turnaround time required in a parallel online transaction process, with as little computation resources and power consumption possible.

10 Load control device
20 Processing device
101 Receiver
102 Assignment controller
103 Transmission queue
104 Transmitter
105 Overflow detector
106 Reassigning part
107 Timer
108 Receiver
201 Receiver
202 Reception queue
203 Controller
204 Transmitter
205 Processing part
206 Cache controller
207 Database

I claim:

1. A load control device including a processor for assigning transaction processes to a plurality of computation resources, the load control device comprising:

a receiver that receives a transaction process request;

an assignment controller that selects assignment destinations to which received transactions are assigned, and then stores the transactions in transmission queues provided for the assignment destinations respectively, wherein at least one of the transmission queues comprises a hardware storage device;

a transmitter that transmits transaction data stored in the transmission queues to the assignment destinations;

an overflow detector that monitors whether or not the number of transactions accumulated in each of the transmission queues corresponding to the respective assignment destinations exceeds an upper limit; and a reassigning part that, when the number of transactions exceeds the upper limit as a result of the monitoring by the overflow detector, reselects assignment destinations to which the transactions stored at the number of transactions exceeding the upper limit are assigned, wherein an ON/OFF state of a power source of each of the computation resources is controlled based on an expected number of transactions, and the assignment controller selects the assignment destinations based on the ON/OFF state of the power source of each of the computation resources.

2. The load control device according to claim 1, wherein based on a data region to be processed in each of the transactions, the assignment destination controller selects an assignment destination having a highest process performance with respect to the data region.

3. The load control device according to claim 1, wherein based on a data region to be processed in each of the transactions, the reassigning part selects an assignment destination having a highest process performance with respect to the data region, from among the assignment destinations in which the number of transactions accumulated in the transmission queues does not exceed the upper limit.

4. The load control device according to claim 1, wherein each of the assignment destination is configured by a combination of processing devices generating lowest power consumptions.

5. The load control device according to claim 1, further comprising a timer that determines a timing at which the overflow detector monitors the number of transactions accumulated in each of the transmission queues corresponding to the assignment destinations, wherein the assignment controller regularly monitors the number of transactions accumulated in the transmission queues in accordance with the timing.

6. A load control method of assigning transaction processes to a plurality of computation resources, the load control method, performed by a processor, comprising the steps of:
receiving a transaction process request;
selecting appropriate assignment destinations to which received transactions are assigned, and then storing the transactions in transmission queues provided for the assignment destinations respectively, wherein at least one of the transmission queues comprises a hardware storage device;

transmitting transaction data stored in the transmission queues to the assignment destinations;

monitoring whether or not the number of transactions accumulated in each of the transmission queues corresponding to the respective assignment destinations exceeds an upper limit; and when the number of transactions exceeds the upper limit as a result of the monitoring, reselecting assignment destinations to which the transactions stored at the number of transactions exceeding the upper limit are assigned, wherein an ON/OFF state of a power source of each of the computation resources is controlled based on an expected number of transactions, and the assignment controller selects the assignment destinations based on the ON/OFF state of the power source of each of the computation resources.

7. A non-transitory computer readable storage medium having stored thereon a program for causing a computer to function as a load control device for assigning transaction processes to a plurality of computation resources, the program causing functions as:

a receiver that receives a transaction process request;

an assignment controller that selects appropriate assignment destinations to which received transactions are assigned, and then stores the transactions in transmission queues provided for the assignment destinations respectively;

a transmitter that transmits transaction data stored in the transmission queues to the assignment destinations;

an overflow detector that monitors whether or not the number of transactions accumulated in each of the transmission queues corresponding to the respective assignment destinations exceeds an upper limit; and a reassigning part that, when the number of transactions exceeds the upper limit as a result of the monitoring by the overflow detector, reselects assignment destinations to which the transactions stored at the number of transactions exceeding the upper limit are assigned, wherein an ON/OFF state of a power source of each of the computation resources is controlled based on an expected number of transactions, and the assignment controller selects the assignment destinations based on the ON/OFF state of the power source of each of the computation resources.

* * * * *